(12) United States Patent
Corrodi et al.

(10) Patent No.: US 12,242,998 B2
(45) Date of Patent: Mar. 4, 2025

(54) SYSTEM AND PROCESS FOR DYNAMIC INFORMATION DISCOVERY BETWEEN COMMERCIAL SHIPPING ASSETS

(71) Applicant: Stoneridge Electronics AB, Solna (SE)

(72) Inventors: Brad Corrodi, Princeton, NJ (US); Milan Gavrilovic, Uppsala (SE)

(73) Assignee: Stoneridge Electronics AB, Solna (SE)

( * ) Notice: Subject to any disclaimer, the term of this patent is extended or adjusted under 35 U.S.C. 154(b) by 95 days.

(21) Appl. No.: 17/320,280

(22) Filed: May 14, 2021

(65) Prior Publication Data

US 2021/0390499 A1 Dec. 16, 2021

Related U.S. Application Data

(60) Provisional application No. 63/039,594, filed on Jun. 16, 2020.

(51) Int. Cl.
*G06Q 10/0832* (2023.01)
*G06F 16/9035* (2019.01)
*G06F 16/955* (2019.01)

(52) U.S. Cl.
CPC ..... *G06Q 10/0832* (2013.01); *G06F 16/9035* (2019.01); *G06F 16/9566* (2019.01)

(58) Field of Classification Search
CPC .......... G06F 11/2094; G06F 16/9566
See application file for complete search history.

(56) References Cited

U.S. PATENT DOCUMENTS

| | | | |
|---|---|---|---|
| 5,247,442 A | 9/1993 | Kendall | |
| 6,385,722 B1* | 5/2002 | Connelly | G06F 9/44552 726/16 |
| 8,533,075 B1* | 9/2013 | Sayers, III | G16H 40/20 705/28 |
| 10,486,596 B2 | 11/2019 | Rathi et al. | |
| 2006/0127097 A1* | 6/2006 | Obrea | G06K 19/0728 398/115 |
| 2016/0052548 A1 | 2/2016 | Singh et al. | |
| 2016/0350701 A1* | 12/2016 | Brehm | G05D 1/0297 |
| 2017/0086011 A1* | 3/2017 | Neves | H04B 1/3822 |
| 2018/0068366 A1* | 3/2018 | Grdina, II | G06Q 10/083 |
| 2018/0144298 A1* | 5/2018 | Rankin | H04L 9/3236 |
| 2018/0172435 A1* | 6/2018 | Robson | G01B 21/20 |
| 2018/0308304 A1 | 10/2018 | Skonberg et al. | |

(Continued)

FOREIGN PATENT DOCUMENTS

DE 102006035021 1/2008

OTHER PUBLICATIONS

International Search Report and Written Opinion for Application No. PCT/US2021/32364 dated Aug. 24, 2021.

(Continued)

*Primary Examiner* — George Chen
*Assistant Examiner* — Duane N. Moore
(74) *Attorney, Agent, or Firm* — Carlson, Gaskey & Olds, P.C.

(57) ABSTRACT

A commercial shipping asset including a plurality of sensors disposed on the commercial shipping asset. A controller is communicatively connected to each sensor in the plurality of sensors. The controller further includes a master asset identifier and a receiver. The controller is configured to implement a dynamic information discovery protocol.

22 Claims, 3 Drawing Sheets

(56) References Cited

U.S. PATENT DOCUMENTS

| | | | | |
|---|---|---|---|---|
| 2018/0370654 A1* | 12/2018 | Cantrell | ............... | G01S 3/789 |
| 2019/0064835 A1* | 2/2019 | Hoofard | ............... | B60T 7/22 |
| 2019/0317947 A1* | 10/2019 | Xu | ............... | G06F 11/3433 |
| 2020/0051015 A1* | 2/2020 | Davis | ............... | G06Q 10/08 |
| 2020/0134551 A1* | 4/2020 | Singh | ............... | G06Q 20/10 |

OTHER PUBLICATIONS

International Preliminary Report on Patentability for International Patent Application No. PCT/US2021/032364 issued on Dec. 13, 2022.

\* cited by examiner

SYSTEM AND PROCESS FOR DYNAMIC INFORMATION DISCOVERY BETWEEN COMMERCIAL SHIPPING ASSETS

CROSS-REFERENCE TO RELATED APPLICATION

This application claims priority to U.S. Patent Application No. 63/039,594 filed on Jun. 16, 2020.

TECHNICAL FIELD

The present disclosure relates generally to commercial shipping ecosystems, and more specifically to a system and process for allowing dynamic information discovery transfer between assets within a commercial shipping ecosystem.

BACKGROUND

Commercial shipping and transportation systems utilize multiple distributed assets to facilitate the movement of goods, or other shipments, from one location to another location. Multiple components work together to allow this movement, including tractors, trailers, cargo containers, cargo chassis, loading and unloading docks, cranes etc. The disparate components are collectively referred to as assets. The grouping of all the assets working cooperatively to transport shipments is referred to as the ecosystem. Within the ecosystem some, or all, of the assets include sensor systems such as video cameras, radar systems, and the like. The sensor systems on any given asset are utilized to facilitate operations of that asset.

SUMMARY OF THE INVENTION

In one exemplary embodiment a commercial shipping asset includes a plurality of sensors disposed on the commercial shipping asset and a controller communicatively connected to each sensor in the plurality of sensors, the controller further including a master asset identifier and a receiver, and wherein the controller is configured to implement a dynamic information discovery protocol.

In another example of the above described commercial shipping asset the commercial shipping asset is one of a tractor, a trailer, a building, a shipping container, a crane and a shipping container chassis.

In another example of any of the above described commercial shipping assets the master asset identifier includes a plurality of data elements, the plurality of data elements including a digital asset identification, and wherein the digital asset identification is globally unique identification of the commercial shipping asset.

In another example of any of the above described commercial shipping assets the plurality of data elements includes a metadata manifest, the metadata manifest defining what data elements are available to share via the dynamic information discovery protocol.

In another example of any of the above described commercial shipping assets the plurality of data elements includes a list of static information corresponding to commercial shipping asset, the list of static information defining at least one of physical dimensions of the commercial shipping asset, a configuration of the commercial shipping asset, at least one of a specific equipment and specific control that is installed in the commercial shipping asset, a sensing capability of the plurality of sensors disposed on the commercial shipping asset, and a list of operations supported by the commercial shipping asset.

In another example of any of the above described commercial shipping assets master asset identifier includes a data supply contract, and wherein the data supply contract defines at least one of an authorized owner of record of the commercial shipping asset and a represented level of precision and accuracy of each data element in the plurality of data elements.

In another example of any of the above described commercial shipping assets the master asset identifier includes a set of dynamic information, and wherein the set of dynamic information defines at least one of an ego position of the commercial shipping asset, and world model of the commercial shipping asset, and an operational state of the commercial shipping asset.

In one exemplary embodiment a commercial shipping ecosystem includes a plurality of commercial shipping assets including at least one passive commercial shipping asset and one smart commercial shipping asset. The at least one smart commercial shipping assets including a master asset identifier and a controller configured to implement a dynamic information discovery protocol, wherein each master asset identifier includes a plurality of data elements, the plurality of data elements including a digital asset identification, and wherein the digital asset identification is globally unique identification of the commercial shipping asset, and the at least one passive commercial shipping asset including a passive master asset identifier locator.

In another example of the above described commercial shipping ecosystem a subset of commercial shipping assets in the plurality of commercial shipping assets include a master asset identifier that is globally unique across multiple commercial shipping ecosystems.

In another example of any of the above described commercial shipping ecosystems the passive master asset identifier locator is an optical pattern configured to be interpreted by a computer processor.

In another example of any of the above described commercial shipping ecosystems the optical pattern encodes a universal resource locator (URL), and wherein the URL is configured to provide a master asset identifier of the corresponding passive commercial shipping asset.

In another example of any of the above described commercial shipping ecosystems further includes a dynamic information disclosure protocol (DIDP) coordinator asset.

In another example of any of the above described commercial shipping ecosystems the DIDP coordinator asset is a dedicated controller.

In another example of any of the above described commercial shipping ecosystems the DIDP coordinator asset is a cloud based software controller.

These and other features of the present invention can be best understood from the following specification and drawings, the following of which is a brief description.

DETAILED DESCRIPTION

Figure 1:
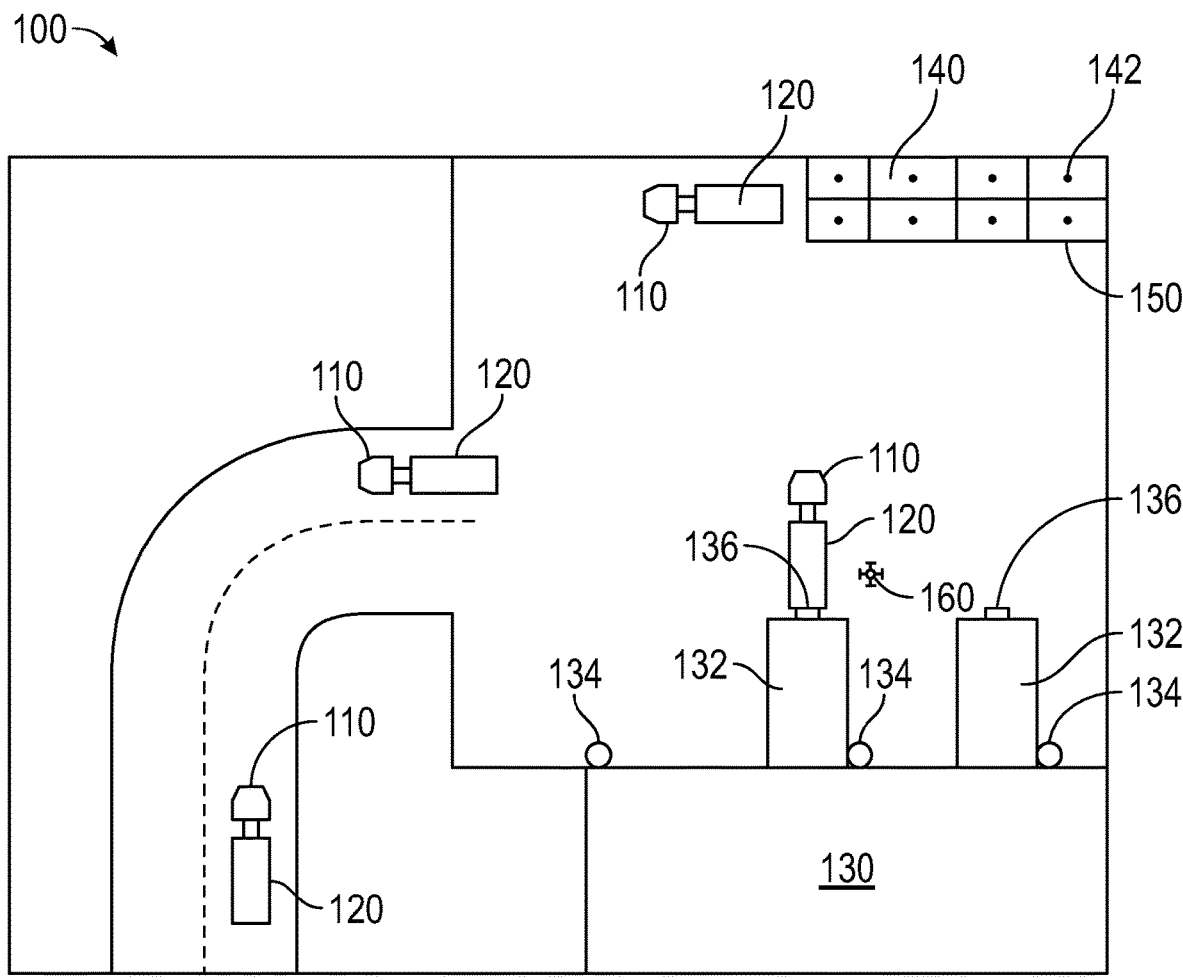
FIG. 1 illustrates an exemplary commercial shipping ecosystem.

FIG. 1 schematically illustrates an exemplary commercial shipping ecosystem 100 according to a first example. The exemplary ecosystem 100 is a warehouse shipping and receiving lot. In alternative examples, the ecosystem 100 can include a highway with multiple trucks, a railyard, a shipyard, an airport, or any similar environment. The commercial shipping ecosystem 100 includes multiple assets, such as tractors 110, trailers 120, a building 130 including loading docks 132, containers 140, and chassis 150 supporting the containers 140. In other ecosystems, additional or alternative assets can be included within the ecosystem. In some configurations a single building 130 can be differentiated into multiple distinct sensor systems, with each sensor system being defined as its own distinct asset within the ecosystem.

In examples where each sensor system within the single building 130 is a distinct asset, the sensor systems can be interconnected with each other via a shared building infrastructure. The assets within the building can be accessed by external assets through the shared infrastructure. In some examples, this access can take the form of accessing a building control unit that controls operations across the shared infrastructure. In other examples, this access can take the form of a wireless or wired access point that allows an exterior asset to connect to the shared infrastructure and communicate directly with each asset within the building system.

Some, or all, of the assets 110, 120, 130, 140, 150 includes sensors such as video cameras 134, GPS monitors 142, radar or LIDAR based proximity sensors 136, and ultrasonic sensors. Each of the sensors is connected to a controller within the asset on which the sensor is mounted. The sensors then assist the asset performing some autonomous function or monitoring function. In some examples additional sensing systems, such as a drone 160, carrying a video camera can be deployed to supplement one or more of the asset sensors. In such examples, the drone 160 is considered to be part of the asset that deployed the drone 160.

Figure 2:
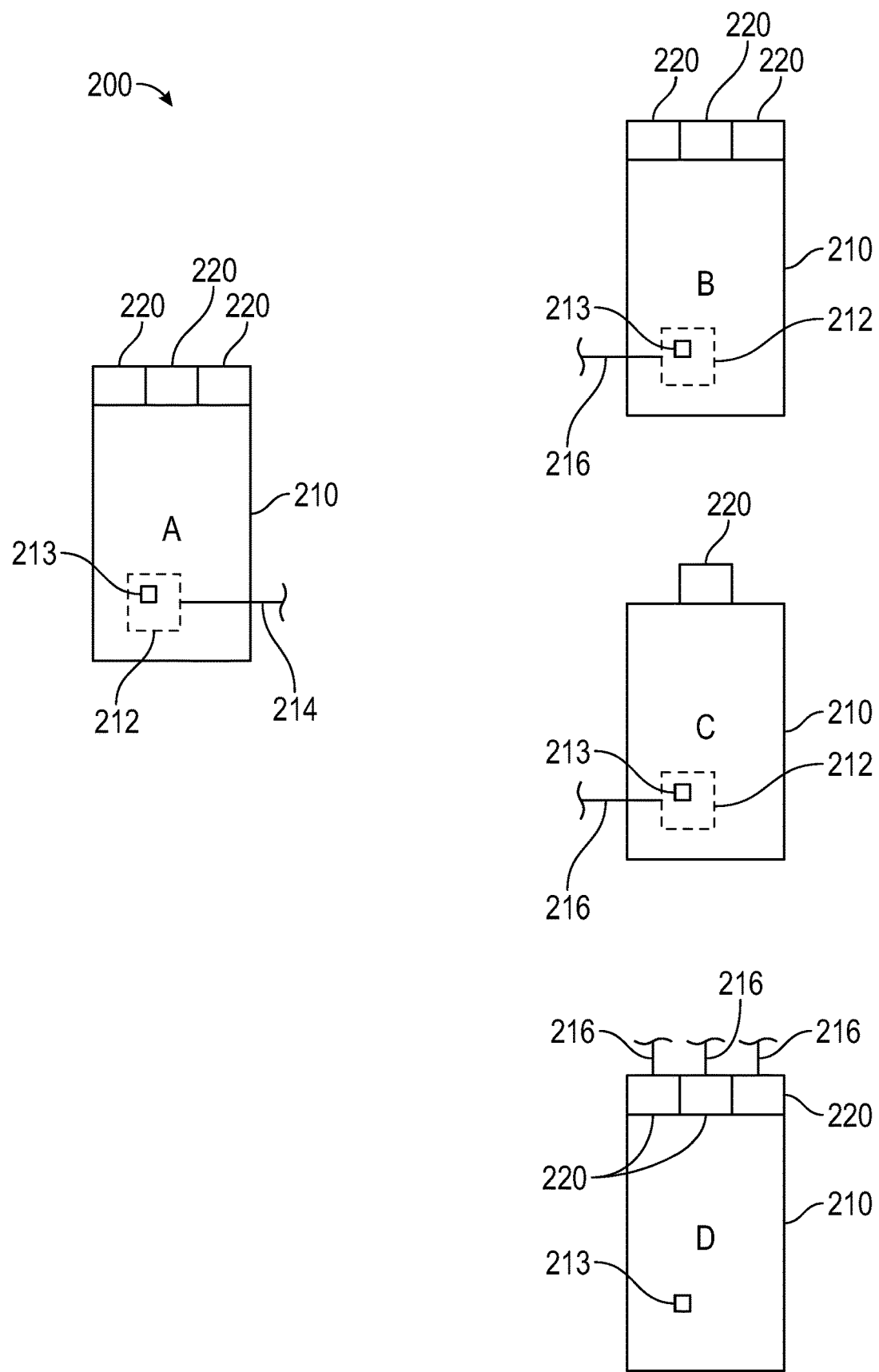
FIG. 2 schematically illustrates a highly schematic representation of an exemplary ecosystem including a dynamic information discovery protocol.

With continued reference to the ecosystem 100 of FIG. 1, FIG. 2 illustrates a highly schematic generic ecosystem 200 in which one or more assets 210 within the ecosystem 100 are able to utilize sensor information from another of the assets 210 within the ecosystem 100 via a dynamic information-discovery protocol.

The first asset 210 (A) includes a controller 212 with a receiver 214. Each asset 210 also includes one or more sensors 220. As described above, the sensors 220 can include proximity sensors, video cameras, or any other relevant sensor type. The receiver 214 is configured to receive data broadcast from the other assets 210, each of which includes a transmitter 216 from a controller 212 or a sensor 220 disposed on the asset 220. In one example, every asset 210 has a transmitter and a receiver. In alternative examples, at least one asset 210 is a passive asset and does not actively communicate or transmit data to other assets. By way of example, a shipping container can take the form of a passive asset. Passive assets 210 utilize a passive identifier that allows other assets to retrieve a master asset identifier corresponding to the passive asset 210 via an online system.

In some examples, the assets 210 constantly transmit the data via the transmitters 216 and any other asset 210 is able to receive the transmitted data. In alternative examples the controllers 212 communicate with each other and establish authorization for the first asset 210 to utilize data provided by the second asset 210. In yet other examples, some assets 210 can continuously transmit data while others requires authorization. In yet further examples, one or more assets can further include passive identifiers in addition to active transmissions.

To facilitate the communications and provision of data between assets, as well as universal registration between assets, each of the controllers 212 includes a dynamic information discovery protocol that allows one intelligent asset 210 in the ecosystem to discern the presence of another asset 210 (intelligent or passive) and query a range of sources to discern relevant information attributes of the other asset 210 in order to support a subsequent coordinated interaction with the other asset 210. Each controller 212, or asset 210 not including a controller 212, includes a master asset identifier 213. The master asset identifier 213 is a globally unique identifier assigned by the protocol to each asset 210 registered within the ecosystem 100. In some examples, the master asset identifier can be globally unique across multiple ecosystems. By way of example, vehicles or other assets that travel between ecosystems 100, 200 include master asset identifiers that are unique across all ecosystems in which the asset 210 is expected to operate. Assets 210 using a passive asset identifier can, in some examples, utilize a QR code or other computer readable plaque to identify a universal resource locator (URL) where the master asset identifier corresponding to the passive asset 210 can be retrieved.

In addition to uniquely identifying the asset 210, the master asset identifier 213 defines attributes of the asset 210. In one example, the master asset identifier 213 defines metadata of the asset 210 including a manifest of the data elements that the asset 210 has available, and from what source(s) the data in the asset 210 is derived. The metadata can include both static and dynamic elements. The metadata further assists other assets 210 in identifying what sensor data to use from an asset and in determining how to use that data.

For the purposes of the following example discussion, asset 210 (A) is referred to as the first asset and is the asset initiating a query and asset 210 (B) is referred to as the second asset and is the asset being queried. It should be appreciated that practical operations can include any of the assets 210 operating as the first asset, and any of the assets 210 operating as the second asset, and that the scale of a particular ecosystem 100, 200 can include any number of assets 210 operating as either the first asset or the second asset.

In one example the master asset identifier 213 on the second asset 210 (B) includes a data element identifying an authorized owner of record of the second asset 210 (B), the represented level of accuracy of each data source on the second asset 210 (B), and a quid pro quo requirement for the second asset 210 (B). The authorized owner of record is a source that can be queried by the first asset 210 (A) accessing the second asset 210 (B) in order to gain authorization to access information, or a subset of information, about the second asset 210 (B). The represented level of accuracy is a level of accuracy or precision corresponding to one or more sensor 216 of the second asset 210 (B) that is sharing data with the first asset 210 (A). By way of example, a video camera sensor may share a resolution of the camera feed, or a proximity sensor may share a range of accuracy of the proximity sensor (e.g. accurate within 2 meters and precision of +/−10 cm.) The quid pro quo requirement of the second asset 210 (B) refers to what data terms must be provided by the first asset 210 (A) in order for the first asset 210 (A) to receive data from the second asset 210 (B) in a data-exchange operation.

In another example, the master asset identifier 213 of the second asset 210 (B) includes a set of static characteristics of the second asset 210 (B) that define the second asset 210

(B). The static characteristics allow the first asset 210 (A) to interpret the data from the sensors 216 of the second asset 210 (B) and determine how the data of the second asset 210 (B) can be used or applied in the operations of the first asset 210 (A). In one example, the static characteristics can include the overall physical dimensions (e.g. a trailer length, height and width) of the second asset 210 (B). In another example, the specific configuration and equipment that may be installed on the second asset 210 (B) (e.g. a trailer may have a refrigeration unit, disc brakes, automatic tire inflation, and/or aerodynamic skirts and tails, etc.). In yet another example, the static characteristics include assigned data for the asset. By way of example, the static data can include a destination, a routing number, a specific paired asset, or any similar information.

In another example, the static characteristics can include the sensing capabilities of one or more sensor included in the second asset 210 (B). The sensing capabilities can include a range, field of view, latency or similar characteristics for sensing the presence of other objects around the second asset 210 (B). By way of example, a trailer can define whether it has temperature sensing, door open/close sensing, absolute positioning (via a GNSS or similar system), relative positioning, gyroscope or compass orientation sensing, cargo and load sensing, axle weight calculation, tire pressure monitoring, and the like.

In another example, the static characteristics can describe the level of support that the second asset 210 (B) has for different data pairing methods and protocols. By way of example, a trailer asset 210 could have a unique identification tag, such as an RFID chip, a barcode, an internet of things URL, a vehicle to anything (V2X) identification ID, or any similar identification for pairing systems.

In general, the static information refers to unchanging characteristics of the asset 210 that define the asset 210 allow other assets 210 to fully interpret dynamic data from the asset 210.

In another example, the master asset identifier 213 includes dynamic information about the second asset 210 (B). The dynamic information can include an ego position of the second asset 210 (B), a world model of the second asset 210 (B) and/or an operational state of the second asset 210 (B). The ego position of the second asset 210 (B) refers to a set of geo-spatial coordinates reflecting what the second asset 210 (B) believes to be its own position and orientation within an objective reference space. The world model refers to what the second asset 210 (B) believes its position and trajectory are relative to other objects/fixtures within a field of view of the second asset 210 (B). The operational state is any information about the actual state of the second asset 210 (B). By way of example, the operational state can reflect whether the second asset 210 (B) is open, reserved, being loaded, fully loaded, ready for pickup, a quantity of weight loaded on the second asset 210 (B), whether the second asset 210 (B) is assigned or allocated to a 'paired' operation (e.g. hooked to a tractor), involved in a move operation, positioned at a docking point, or engaged in a load or unload operation.

In another example, the master asset identifier of the second asset 210 (B) includes any accumulated experience data about the second asset 210 (B). By way of example, the accumulated experience data can include previously carried loads, accumulated wear on the second asset 210 (B), a maintenance history of the second asset 210 (B), relevant operational and control data such as braking efficiency data, handling data, fuel efficiency coefficients and the like.

It is further appreciated that the master asset identifier of any given asset 210 can include any relevant static and dynamic data including some or all of the above, or additional static or dynamic data that may be relevant.

Figure 3:
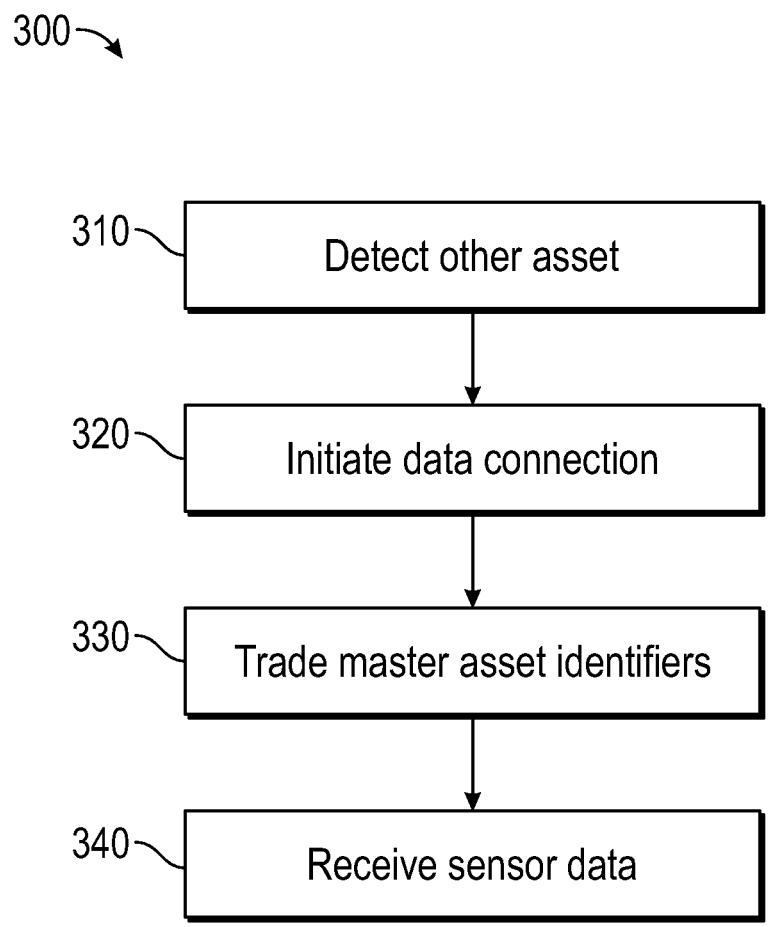
FIG. 3 illustrates a high level example operation of the dynamic information discovery protocol.

With continued reference to the ecosystems 100, 200 of FIGS. 1 and 2, FIG. 3 illustrates an exemplary method 300 for operating the dynamic information discovery protocol. In the example method 300, each asset in the ecosystem scans for other assets in a "Detect Other Asset" step 310. In some examples, the scanning includes actively searching for wireless signals output from other assets. In other examples, the scanning includes passively determining if any assets are currently broadcasting their presence. In yet further examples, both active and passive scanning can be utilized by a single asset. In yet further examples, the first asset can scan for passive identifiers, such as QR codes and the like, that are positioned on the other assets.

Once another asset is detected, the first asset initiates a data connection in an "Initiate Data Connection" step 320. The data connection typically includes a wireless data connection using a transfer protocol according to any known data transfer protocol system, although alternative transfer systems including physical connections and other remote data connections can be utilized to similar effect depending on the particular assets involved in the data transfer. When another intelligent asset is discovered, the data connection can be directly between the intelligent assets. Alternatively, when a passive asset is discovered, the data connection can be between the discovering asset and an online system storing master asset identifiers and tracking assets through the environment 100, 200.

After the data connection is secured, and the assets ensure that they are capable of accurately communicating, the master asset identifier of the discovered asset is transferred to the discovering asset in a "Trade Master Asset Identifiers" step 330. In some examples, the transfer is a two-way exchange of master asset identifiers. In other examples, the transfer can be one-way from the online system to the discovering asset. Once master asset identifiers have been traded, the first asset analyzes the master asset identifier of the second asset to determine what sensor data from the second asset can be used by the first asset to assist in a current or future operations of the first asset. By way of example, a tractor trailer asset engaging in a docking maneuver could trade master asset identifiers with a trailer dock and determine that a proximity sensor for operating an automatic loading bay door of the dock can be utilized to assist in determining the relative position of the trailer and the dock.

After trading and analyzing master asset identifiers, each asset receives useful sensor data from the other asset, based on the information determined by analyzing the master asset identifier. In some examples, all the sensor data from one asset is transferred as a single set, including identifiers, and the asset receiving the remote sensor data is able to utilize or not utilize any particular sensor data. In alternative examples, only the needed or relevant sensor data is transferred from one asset to the other asset while reducing the number of redundant sensors required to implement the operational processes.

With reference again to FIG. 2, one or more of the assets 210 can be or include a digital management system configured to coordinate operations within the DIDP environment. Assets including systems such as this are referred to as DIDP coordinator assets. The DIDP coordinator asset is, in some examples, configured to coordinator sensor data sharing between assets 210.

In one example, a first asset 210A may be a commercial vehicle looking for a fixed position camera that has a view of the commercial vehicles current position. In a system lacking one or more DIDP coordinator asset(s), the first asset 210A reviews the master asset identifier of every asset it identifies to determine if any assets have the desired sensor information. In contrast, an environment including one or more coordinator asset, the first asset 210A contacts the coordinator asset with a query indicating what sensor data is being sought out. The coordinator asset then responds to the query with an identification of any assets 210 in range of the first asset 210A that include the required sensor data. This coordination allows the first asset 210A to more quickly identify and locate relevant assets, particularly in DIDP environments that are heavily saturated with assets 210.

In some examples, the DIDP coordinator asset can be a static dedicated control system, such as a shipyard controller, that monitors every asset in a given portion of the DIDP environment. In alternative examples, the DIDP coordinator asset can be a software system or cloud based program that receives and processes the queries.

By incorporating the dynamic information discovery protocol in each asset, or a subset of assets, within an ecosystem, the assets can utilize methods and operations that improve the speed, efficiency, safety, and traceability of various operational processes within the ecosystem.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A primary commercial shipping asset comprising:
a plurality of sensors disposed on the primary commercial shipping asset; and
a controller communicatively connected to each sensor in the plurality of sensors, the controller further including a first master asset identifier and a receiver, and wherein the controller is configured to implement a dynamic information discovery protocol (DIDP);
wherein the DIDP includes instructions for causing the controller to:
detect a presence of a second commercial shipping asset,
initiate a data connection with the second commercial shipping asset,
receive a second master asset identifier from the second commercial shipping asset,
analyze the second master asset identifier,
transfer the at least one set of sensor data from the second commercial shipping asset to the controller, and
perform at least one operation of the primary commercial shipping asset using the at least one set of sensor data originating from the second commercial shipping asset;
wherein the second master asset identifier from the second commercial shipping asset includes:
an attribute of the second commercial shipping asset, wherein the attribute includes accumulated wear on the second commercial shipping asset; or
a maintenance history of the second commercial shipping asset.

2. The primary commercial shipping asset of claim 1, wherein:
the plurality of data elements is a second plurality of data elements;
the first master asset identifier includes a first plurality of data elements, the first plurality of data elements including a first digital asset identification, and wherein the first digital asset identification is globally unique identification of the primary commercial shipping asset; and
the second master asset identifier includes a second digital asset identification, and wherein the second digital asset identification is globally unique identification of the second commercial shipping asset.

3. The primary commercial shipping asset of claim 2, wherein:
the plurality of first data elements includes a first metadata manifest, the first metadata manifest defining what data elements are available for the primary commercial shipping asset to share via the dynamic information discovery protocol.

4. The primary commercial shipping asset of claim 2, wherein the first plurality of data elements includes a list of static information corresponding to the primary commercial shipping asset, the list of static information defining at least one of physical dimensions of the primary commercial shipping asset, a configuration of the primary commercial shipping asset, a specific equipment installed in the primary commercial shipping asset, a specific control installed in the primary commercial shipping asset, a sensing capability of the plurality of sensors disposed on the primary commercial shipping asset, and a list of operations supported by the primary commercial shipping asset.

5. The primary commercial shipping asset of claim 2, wherein first master asset identifier includes a data supply contract, and wherein the data supply contract defines at least one of an authorized owner of record of the primary commercial shipping asset and a represented level of precision and accuracy of each data element in the plurality of data elements.

6. The primary commercial shipping asset of claim 2, wherein the first master asset identifier includes a set of dynamic information, and wherein the set of dynamic information defines at least one of an ego position of the primary commercial shipping asset, a world model of the primary commercial shipping asset, and an operational state of the primary commercial shipping asset.

7. The primary commercial shipping asset of claim 1, wherein the second master asset identifier from the second commercial shipping asset identifies an authorized owner of record of the second commercial shipping asset.

8. The primary commercial shipping asset of claim 1, wherein the second master asset identifier from the second commercial shipping asset identifies a represented level of accuracy of each data source on the second commercial shipping asset, the represented level of accuracy comprising a resolution of a camera feed or a range of accuracy of a proximity sensor.

9. The primary commercial shipping asset of claim 1, wherein the second master asset identifier from the second commercial shipping asset identifies a quid pro quo requirement for the second commercial shipping asset that indicates what data terms must be provided by a commercial shipping asset in order for the commercial shipping asset to receive data from the second commercial shipping asset in a data-exchange operation.

10. The primary commercial shipping asset of claim 1, wherein the second master asset identifier from the second commercial shipping asset includes a description of loads previously carried by the second commercial shipping asset.

11. The primary commercial shipping asset of claim 1, wherein the second master asset identifier from the second commercial shipping asset includes a maintenance history of the second commercial shipping asset.

12. The primary commercial shipping asset of claim 1, wherein:
the primary commercial shipping asset is a tractor trailer asset and the second commercial shipping asset is a trailer dock;
the sensor on the second commercial shipping asset is a proximity sensor for an automatic loading bay door, and the at least one set of sensor data originating from the sensor on the second commercial shipping asset is a proximity data set; and
the at least one operation of the primary commercial shipping asset comprises a docking maneuver of the primary commercial shipping asset to the trailer dock.

13. A commercial shipping ecosystem comprising:
a plurality of commercial shipping assets including at least one passive commercial shipping asset, and at least two smart commercial shipping assets, one of which is a primary commercial shipping asset;
the at least one passive commercial shipping asset including a passive master asset identifier locator;
each of the at least two smart commercial shipping assets including a respective master asset identifier and a corresponding controller configured to implement a dynamic information discovery protocol (DIDP), wherein each respective master asset identifier includes a plurality of data elements, the plurality of data elements including a digital asset identification, and wherein the digital asset identification is globally unique identification of the corresponding smart commercial shipping asset; and
wherein the DIDP includes instructions for causing the controller of the primary commercial shipping asset of the at least two smart commercial shipping assets to:
detect a presence of a second smart commercial shipping asset of the at least twosmart commercial shipping assets,
initiate a data connection with the second commercial shipping asset,
receive a second master asset identifier from the second commercial shipping asset,
analyze the second master asset identifier,
transfer the at least one set of sensor data from the second commercial shipping asset to the controller, and
perform at least one operation of the primary commercial shipping asset using the at least one set of sensor data originating from the second commercial shipping asset;
wherein the second master asset identifier from the second commercial shipping asset includes:
an attribute of the second commercial shipping asset, wherein the attribute includes accumulated wear on the second commercial shipping asset; or
a maintenance history of the second commercial shipping asset.

14. The commercial shipping ecosystem of claim 13, wherein a subset of commercial shipping assets in the plurality of commercial shipping assets includes a master asset identifier that is globally unique across multiple commercial shipping ecosystems.

15. The commercial shipping ecosystem of claim 13, wherein the passive master asset identifier locator is an optical pattern configured to be interpreted by a computer processor.

16. The commercial shipping ecosystem of claim 15, wherein the optical pattern encodes a universal resource locator (URL), and wherein the URL is configured to provide a master asset identifier of the corresponding passive commercial shipping asset.

17. The commercial shipping ecosystem of claim 13, further including a dynamic information disclosure protocol (DIDP) coordinator asset.

18. The commercial shipping ecosystem of claim 17, wherein the DIDP coordinator asset is a dedicated controller.

19. The commercial shipping ecosystem of claim 17, wherein the DIDP coordinator asset is a cloud based software controller.

20. The commercial shipping ecosystem of claim 17, wherein:
the primary commercial shipping asset is a tractor trailer asset and the second smart commercial shipping asset is a trailer dock;
the sensor on the second smart commercial shipping asset is a proximity sensor for an automatic loading bay door, and the at least one set of sensor data originating from the sensor on the second smart commercial shipping asset is a proximity data set; and
the at least one operation of the primary commercial shipping asset comprises a docking maneuver of the primary commercial shipping asset to the trailer dock.

21. The commercial shipping ecosystem of claim 13, wherein the second master asset identifier from the second commercial shipping asset includes a maintenance history of the second commercial shipping asset.

22. A primary commercial shipping asset comprising:
a plurality of sensors disposed on the primary commercial shipping asset; and
a controller communicatively connected to each sensor in the plurality of sensors, the controller further including a first master asset identifier and a receiver, and wherein the controller is configured to implement a dynamic information discovery protocol (DIDP);
wherein the DIDP includes instructions for causing the controller to:
detect a presence of a second commercial shipping asset,
initiate a data connection with the second commercial shipping asset,
receive a second master asset identifier from the second commercial shipping asset, wherein the second master asset identifier from the second commercial shipping asset includes:
an attribute of the second commercial shipping asset, wherein the attribute includes accumulated wear on the second commercial shipping asset; or
maintenance history of the second commercial shipping asset,
identify, in the second master asset identifier:
a plurality of data elements that the second commercial shipping asset has available, the data elements corresponding to at least one set of sensor data originating from a sensor on the second commercial shipping asset using the second master asset identifier, and
a metadata manifest defining the data elements, transfer the at least one set of sensor data from the second commercial shipping asset to the controller, and perform at least one operation of the primary commercial shipping asset using the at least one set of sensor data originating from the second commercial shipping asset.

\* \* \* \* \*